United States Patent
Leroy et al.

(10) Patent No.: US 12,012,106 B2
(45) Date of Patent: Jun. 18, 2024

(54) METHOD FOR PROTECTING AN ON-BOARD ELECTRICAL NETWORK OF A TRUCK

(71) Applicant: Volvo Truck Corporation, Gothenburg (SE)

(72) Inventors: Frédéric Leroy, Lyons (FR); Julien Maitre, Chuzelles (FR); Maxime Valero, Meyzieu (FR)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 17/729,107

(22) Filed: Apr. 26, 2022

(65) Prior Publication Data

US 2022/0355797 A1    Nov. 10, 2022

(30) Foreign Application Priority Data

May 4, 2021 (EP) .................................... 21171982

(51) Int. Cl.
*B60L 1/00* (2006.01)
*B60R 16/033* (2006.01)
(Continued)

(52) U.S. Cl.
CPC ....... *B60W 30/1886* (2013.01); *B60R 16/033* (2013.01); *B60W 10/06* (2013.01); *B60W 10/26* (2013.01); *B60W 10/30* (2013.01); *H01M 10/486* (2013.01); *B60W 2510/244* (2013.01); *B60W 2510/246* (2013.01); *B60W 2510/248* (2013.01); *B60W 2510/305* (2013.01); *H01M 2220/20* (2013.01)

(58) Field of Classification Search
CPC .. B60W 30/1886; B60W 10/06; B60W 10/26; B60W 10/30; B60R 16/033; H01M 10/48
See application file for complete search history.

(56) References Cited

U.S. PATENT DOCUMENTS 10,160,442 B2 *  12/2018  Higashitani ........... B60W 10/30
10,804,815 B1 *  10/2020  Chen ...................... B60L 50/14
(Continued)

OTHER PUBLICATIONS

Extended European Search Report for European Patent Application No. 21171982.8, dated Oct. 27, 2021, 9 pages.

*Primary Examiner* — Gonzalo Laguarda
(74) *Attorney, Agent, or Firm* — Withrow & Terranova, PLLC

(57) ABSTRACT

The invention relates to a method for protecting an on-board electrical network of a truck having a base-line equipment provided by a truck manufacturer, and having base-line loads having a current consumption, an auxiliary equipment fitted a posteriori by a truck body builder, and having auxiliary loads having a current consumption, and a battery. The method further comprises, when the engine of the truck is ON: determining that the engine is to be turned off, determining a total current consumption of the truck, determining the battery maximum capacity, if the total current consumption is lower than the battery maximum capacity, turning off the engine, and, if the total current consumption is higher than the battery maximum capacity, reducing the current consumption of at least one adjustable auxiliary load.

14 Claims, 4 Drawing Sheets

(51) Int. Cl.
*B60W 10/06* (2006.01)
*B60W 10/26* (2006.01)
*B60W 10/30* (2006.01)
*B60W 30/188* (2012.01)
*H01M 10/48* (2006.01)

(56) References Cited

U.S. PATENT DOCUMENTS

| | | | |
|---|---|---|---|
| 2011/0246013 A1 | 10/2011 | Yee et al. | |
| 2016/0316621 A1 | 11/2016 | Fritz et al. | |
| 2021/0114583 A1* | 4/2021 | Flores Aviña | B60K 5/1208 |

* cited by examiner

METHOD FOR PROTECTING AN ON-BOARD ELECTRICAL NETWORK OF A TRUCK

RELATED APPLICATIONS

The present application claims priority to European Patent Application No. 21171982.8, filed on May 4, 2021, and entitled "METHOD FOR PROTECTING AN ON-BOARD ELECTRICAL NETWORK OF A TRUCK," which is incorporated herein by reference in its entirety.

FIELD OF THE INVENTION

This disclosure pertains to the field of controlling loads of an on-board electrical network of a truck, the truck comprising a base-line equipment provided by a truck manufacturer and an auxiliary equipment fitted a posteriori by a truck body builder, and the loads comprising base-line loads comprised in the base-line equipment and auxiliary loads comprised in the auxiliary equipment. In particular, this disclosure relates to a method for protecting the on-board electrical network of the truck and a truck in which said method is implemented.

BACKGROUND ART

In the truck industry, it is known that a truck is provided with a base-line equipment provided by the truck manufacturer. This base-line equipment includes all electrical loads necessary to the operation of the truck, such as air compressor, steering, lighting, etc. For example, it can be formed by a chassis equipped with a passenger's cabin and powertrain components. It is also known that this base-line equipment can be delivered to a truck body builder, for example located on another site. The truck body builder usually customizes the base-line equipment of the truck depending on use case and preferences by adding one or more auxiliary equipment (also known as BodyBuilder). For example, the auxiliary equipment can be additional lights, a garbage compactor, a tipping trailer, an aerial bucket, a cooling compartment . . . .

The on-board electrical network of the truck is designed to handle the current consumption of the base-line equipment fitted by the original truck manufacturer. This means that the alternator coupled to the internal combustion engine, the battery, the harness and the various relays are designed to handle the current consumption of the base-line electrical loads comprised in the base-line equipment. When the truck body builder installs the auxiliary equipment in the truck to adapt the truck to its specific use, the auxiliary equipment comprises auxiliary loads which increase the current to be provided by the on-board electrical network.

Normally, the truck body builder follows rules given by the original truck manufacturer to install the auxiliary equipment, so that the current to be provided by the on-board electrical network to the auxiliary loads can be supported by the on-board electrical network.

However, in a first situation where the truck body builder follows the rules, it can happen that in some modes in which the truck operates, the current consumption of the auxiliary loads become higher than the current that can be supplied by the on-board electrical network, especially in operating modes where the internal combustion engine is switched off and where only the battery supplies current to the on-board electrical network.

Furthermore, it also happens in a second situation, that the truck body builder does not follow the rules. Consequently, the current consumption of the auxiliary loads can become higher than the current that can be supplied by the on-board electrical network, especially in operating modes where the internal combustion engine is switched off and where only the battery supplies current to the on-board electrical network.

In each situation, when the auxiliary loads current consumption becomes too high compared to what the on-board electrical network can deliver, the voltage supply of the network drops. Some equipment of the truck go into a safety mode and stop working. One or more electronic control units (ECU) automatically reset.

Typically, truck can be fitted with auxiliary equipment to form a garbage truck. The garbage truck is generally provided with an electric compactor as auxiliary load. This electric compactor requires a lot of power to operate. Therefore, if the internal combustion engine is turned off while the electric compactor is operating, a lot of current is drawn from the battery, which can lead the on-board electric network to collapse. Typically, more and more trucks are provided with a Start & Stop function, whereby the internal combustion engine is turned off as soon as the truck reaches standstill. This is particular true for garbage trucks which stop many times during their mission. Accordingly, if the electric compactor is activated while the internal combustion engine is off, the battery may not be able to provide enough current and the on-board electrical network voltage can drop to a critical level.

There is therefore a need for protecting an on-board electrical network of trucks in every operating modes of the trucks, especially when the internal combustion engine is switched off and only the battery supplies power to the on-board electrical network.

In the patent application US2016/316621 A1, it has been proposed an energy management system for an agricultural vehicle arrangement comprising an electric power supply unit for the supply of a large number of electrical consumers with electric power and consumption monitoring unit for the determination of a total electric power demand dependent on an actual operating state of the electrical consumers. The consumption monitoring unit operably estimates the electric power supply that is available from the electric power supply unit and compares it to the determined total electric power demand in order to reduce the electric power supply to the electrical consumers as a function of assigned supply priorities when the available electric power supply is exceeded by the determined total energy demand.

This energy management system proposes a method for controlling the auxiliary loads to guarantee the operation of the electrical network. However, this energy management system cannot be used in every operating modes of the vehicle, especially when the internal combustion engine is off and the auxiliary loads are still operating.

It is an object of the present disclosure to propose a method for protecting an on-board electrical network of trucks, especially when the internal combustion engine is switched off and only the battery supplies power to the on-board electrical network.

SUMMARY

It is proposed a method for protecting an on-board electrical network of a truck, the truck comprising:
- an internal combustion engine;
- a base-line equipment provided by a truck manufacturer, and having one or more base-line loads connected to the on-board electrical network and configured to be supplied by the on-board electrical network, and to have a current consumption,
- an auxiliary equipment fitted a posteriori by a truck body builder, and having one or more auxiliary loads connected to the on-board electrical network and configured to be supplied by the on-board electrical network, and to have a current consumption,
- an alternator for supplying current to the on-board electrical network from the internal combustion engine and
- a battery having a battery maximum capacity, and connected to the on-board electrical network;

the method comprising, when the internal combustion engine is ON:
1) determining that the internal combustion engine is to be switched off,
2) determining a total current consumption of the truck as the sum of the current consumption of the one or more base-line loads and the one or more auxiliary loads
3) determining the battery maximum capacity,
4) comparing the total current consumption to the battery maximum capacity and if the total current consumption is lower than to the battery maximum capacity, turning off the internal combustion engine and,
if the total current consumption is higher than the battery maximum capacity, reducing the current consumption of at least one adjustable auxiliary load, selected from the one or more auxiliary loads, so that the total current consumption becomes lower than the battery maximum capacity or preventing the internal combustion engine from being switched off.

In this disclosure, the word "ON" is used to describe an activated status of a component or device. For example, the expression "the internal combustion engine is ON" means that the internal combustion engine is in a switched on state, i.e. the engine is running. In this situation, alternator is running and provides electrical current. Similarly, the word "OFF" is used to describe a deactivated status of a component or device. For example, the expression "the internal combustion is OFF" means that the internal combustion engine is in a switched off state, i.e. the engine is stopped (not running) In this situation, alternator does not provide any electrical current.

Under the phrase "battery maximum capacity", it is understood a maximum current (expressed in ampere, A) that can be delivered by the battery irrespective of the remaining energy stored in the battery (expressed in ampere-hour, A.h).

This present method proposes to determine the current consumption of the auxiliary loads before the internal combustion engine is switched off. The internal combustion engine is thus turned off only if the total current consumption is lower than the battery maximum capacity, meaning only if the battery can supply the base-line loads and the auxiliary loads.

Otherwise, the current consumption of at least one auxiliary loads, named adjustable auxiliary load, is reduced, so that the total current consumption becomes lower than the battery maximum capacity. By "reducing", it is to be understood that the current consumption of the at least one adjustable auxiliary load can be decreased, but the adjustable auxiliary load still work in a degraded mode, or the current consumption can be reduced to zero, and the adjustable auxiliary load is switched off. Once the current consumption of the adjustable loads is reduced, and the battery can supply the base-line loads and the auxiliary loads, the internal combustion engine is turned off. The on-board electrical network is thus protected when the internal combustion engine is switched off.

Alternatively, the internal combustion engine is prevented from being switched off. Then, the alternator carries on to deliver current to the on-board electrical network. The current supply of all the auxiliary loads can thus be ensured by the on-board electrical network, and the auxiliary loads continue to operate in a normal mode, without causing a voltage drop of the voltage supply.

Hence, by determining the current consumption of the auxiliary loads before deciding if the internal combustion engine can be turned off, it guarantees that the current consumption of the auxiliary loads is always adapted to the current that can be supplied by the on-board electrical network. It thus avoids that some equipment of the truck goes into a safety mode and stop working, or that one or more electronic control units automatically reset.

The following features, can be optionally implemented, separately or in combination one with the others.

According to one aspect, the method comprises, after determining that the internal combustion engine is to be turned off,
- S1b) determining if at least one of the one or more auxiliary loads is ON, and
- if at least one of the one or more auxiliary load is ON, continuing the method,
- if none of the one or more auxiliary loads is ON, turning off the internal combustion engine.

Indeed, when any one of the one or more auxiliary loads is OFF (in other words, in a switched off state), the battery can supply the base-line loads. Therefore, the method can by-pass the determination of the total current consumption and the battery maximum capacity, and the internal combustion engine can be turned off immediately. The method is thus accelerated.

According to one aspect, the method comprises, when the internal combustion engine is OFF and when at least one selected auxiliary load, selected from the one or more auxiliary loads is OFF,
- Sa) receiving an activation request to switch ON the at least one selected auxiliary load,
- Sb) determining the current consumption of the at least one selected auxiliary load
- Sc) determining a total current consumption of the truck as the sum of the current consumption of the one or more base-line loads and the one or more auxiliary loads
- Sd) determining the battery maximum capacity,
- Se) calculating an available capacity of the battery corresponding to the difference between the battery maximum capacity and the total current consumption and
- if the current consumption of the at least one selected auxiliary load is lower than the available capacity of the battery, switching on the selected auxiliary load
- if the current consumption of the at least one selected auxiliary load is higher than the available capacity of the battery, preventing the selected auxiliary load from switching on, or turning on the internal combustion engine before switching on the selected auxiliary load.

Therefore, when the internal combustion engine is OFF, the method prevents a selected auxiliary load, corresponding to an auxiliary load which is OFF (in other words, which is in a switched off state) and which has been requested to be switched ON, from being switched ON, if the battery cannot supply enough current to the on-board electrical network. It thus avoids a voltage drop of the on-board electrical network that could occur if the selected auxiliary load were switched ON.

According to one aspect, the method comprises, when the internal combustion engine is OFF and when at least one selected auxiliary load, selected from the one or more auxiliary loads is OFF, Sa') receiving an activation request to switch on the at least one selected auxiliary load,
Sb') turning on the internal combustion engine
Sc') switching on the selected auxiliary load.

Therefore, when the internal combustion engine is OFF and when an auxiliary load, named selected auxiliary load, is requested to be switched on, the method provides that the internal combustion engine first turns on, to ensure that the alternator can deliver enough current to the on-board electrical network, before the selected auxiliary load is switched on. It thus avoids a voltage drop of the on-board electrical network that could occur if the selected auxiliary load were switched on whereas the internal combustion engine is OFF.

According to one aspect, the battery maximum capacity can be determined depending on at least one of the following parameters, including:
the State of Charge (SoC) of the battery,
the State of Health (SoH) of the battery;
the temperature of the battery.

Over time, the battery maximum capacity evolves. Taking into account the state of charge and/or the state of health and/or the temperature allows to adapt the battery maximum capacity value as close as possible to the reality.

According to one aspect, the current consumption of the at least one adjustable auxiliary load is reduced using a relay, or a transistor, for example a MOSFET switch.

The relay allows to reduce the current consumption of the adjustable load to zero. When the relay is activated, the current supply of the adjustable load is stopped. The adjustable load is thus switched off. The transistor allows to reduce the current consumption of the adjustable load to a lower level above zero, so that the adjustable auxiliary load still works in a degraded mode According to one aspect, the method is implemented while the truck is moving, in particular when switching to a fuel saving mode in which the truck is moving with the internal combustion engine off or at low engine speed.

This situation is met, for example, during "eco-Roll" phases, also known as "I-Roll" phases. Indeed, under these circumstances, vehicle can keep moving without any power from the engine, such as when driving on flat roads or downhill. During these phases, a freewheel function is automatically activated in order to cut fuel consumption that saves fuel. To further save energy during these phases, the engine can be turned off. The only energy source is then the battery connected to the on-board electrical network.

According to one aspect, an alert is sent to the driver when the current consumption of the at least one adjustable auxiliary load is reduced.

The driver is thus warned that the current consumption, and thus the current supply, of the adjustable auxiliary load is reduced According to one aspect, the one or more auxiliary loads are each assigned to a predetermined supply priority and if the total current consumption is higher than the battery maximum capacity, the one or more auxiliary loads are selected as the at least one adjustable auxiliary load depending on the assigned predetermined supply priority.

Therefore, the current consumption of the auxiliary loads associated with a higher supply priority is reduced as late as possible.

According to one aspect, the current consumption of the one or more auxiliary loads is recorded This allows to learn about the current consumption of the auxiliary loads and to know how often an auxiliary load is switched off.

The present disclosure is also directed to a truck comprising:
an on-board electrical network;
an internal combustion engine;
a base-line equipment provided by a truck manufacturer, and having one or more base-line loads connected to the on-board electrical network and configured to be supplied by the electrical network, and to have a current consumption,
an auxiliary equipment fitted a posteriori by a truck body builder, and having one or more auxiliary loads connected to the on-board electrical network and configured to be supplied by the on-board electrical network, and to have a current consumption,
an alternator for supplying current to the on-board electrical network from the internal combustion engine and
a battery having a battery maximum capacity, and connected to the on-board electrical network;
wherein a method for protecting the on-board electrical network of the truck according to present disclosure is implemented.

According to one aspect, the base-line equipment comprises a base-line electronic control unit configured to control the one or more base-line loads and the one or more auxiliary loads.

According to one aspect, the base-line equipment comprises a base-line actuator, the base-line electronic control unit being configured to control the base-line actuator and
the one or more auxiliary loads comprise a direct auxiliary load coupled to the base-line actuator,
wherein, when the total current consumption is higher than the battery maximum capacity and the direct auxiliary load is selected among the at least one adjustable auxiliary load, the base-line electronic control unit is configured to activate the base-line actuator and the base-line actuator is configured to reduce the current consumption of the direct auxiliary load.

According to one aspect, the auxiliary equipment comprises an auxiliary electronic control unit communicating with the base-line electronic control unit and an auxiliary actuator, the auxiliary control unit being configured to controlled the auxiliary actuator, and
wherein the one or more auxiliary loads comprise an indirect auxiliary load coupled to the auxiliary actuator,
wherein, when the total current consumption is higher than the battery maximum capacity and the indirect auxiliary load is selected among the at least on adjustable auxiliary load, the base-line electronic control unit is configured to send a control message to the auxiliary electronic control unit, the auxiliary electronic control unit is configured to activate the auxiliary actuator and the auxiliary actuator is configured to reduce the current consumption of the direct auxiliary load.

BRIEF DESCRIPTION OF DRAWINGS

Other features, details and advantages will be shown in the following detailed description and on the figures, on which.

DESCRIPTION OF EMBODIMENTS

In the figures, the same references denote identical or similar elements. For sake of clarity, various elements may not be represented at scale.

Figure 1:
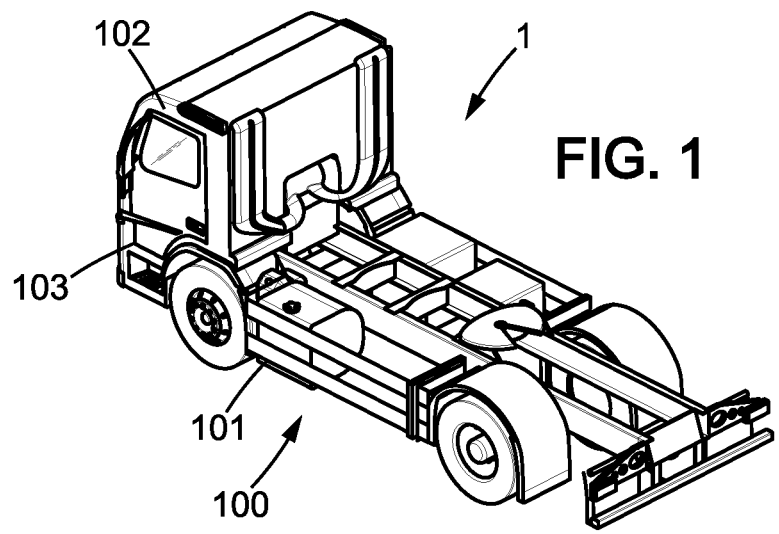
FIG. 1 shows a truck provided with a base-line equipment, provided by a truck manufacturer.

FIG. 1 shows a truck 1 equipped with a base-line equipment 100 provided by a truck manufacturer. The truck 1 is shown before the truck 1 is fitted with an auxiliary equipment 200 by a truck body builder. In the example shown on FIG. 1, the base-line equipment is formed by a chassis 101 equipped with a passenger's cabin 102 and powertrain components 103, and other components necessary to the operation of the truck 1, such as air compressor, steering, lighting, etc. The truck 1 comprises an on-board electrical network 10 to which base-line loads 110 of the base-line equipment 100 are connected to operate the base-line equipment 100. In particular, the base-line equipment 100 can comprise one or more base-line loads 110. The base-line loads 110 are the loads used in the base-line equipment 100 such as in the powertrain components 103 or the above mentioned other components necessary to the operation of the truck 1.

Figure 2:
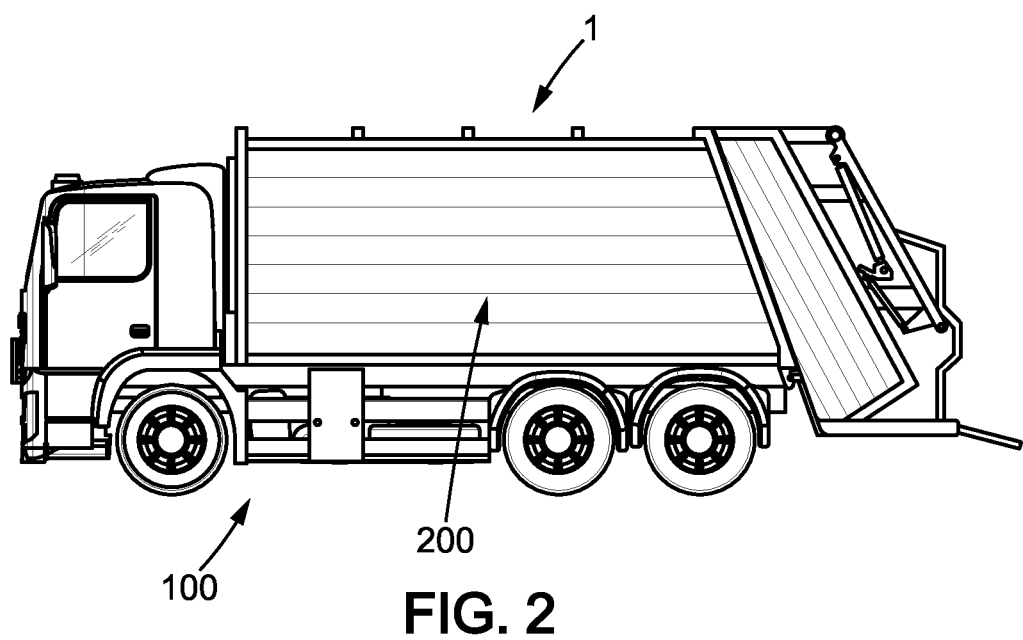
FIG. 2 shows the truck represented on FIG. 1 fitted with an auxiliary equipment, provided by a truck body builder.

FIG. 2 shows the truck 1 after the truck 1 has been fitted with an auxiliary equipment 200 by a truck body builder. In the example shown on FIG. 2, the auxiliary equipment 200 is a garbage compactor 201. Therefore, the truck 1 fitted with the auxiliary equipment 200 forms a garbage truck 1. Alternatively, the truck 1 could be fitted with other auxiliary equipment 200 such as additional lights, a tipping trailer, an aerial bucket, a cooling compartment, or any auxiliary equipment providing a specific function to the truck 1.

The auxiliary equipment 200 comprises auxiliary loads 210 connected to the on-board electrical network 10 to operate the auxiliary equipment 200. In particular, the garbage truck 1 shown on FIG. 2 comprises an electric compactor as an auxiliary load 210. In particular, the auxiliary equipment can comprise one or more auxiliary loads 210.

Figure 3:
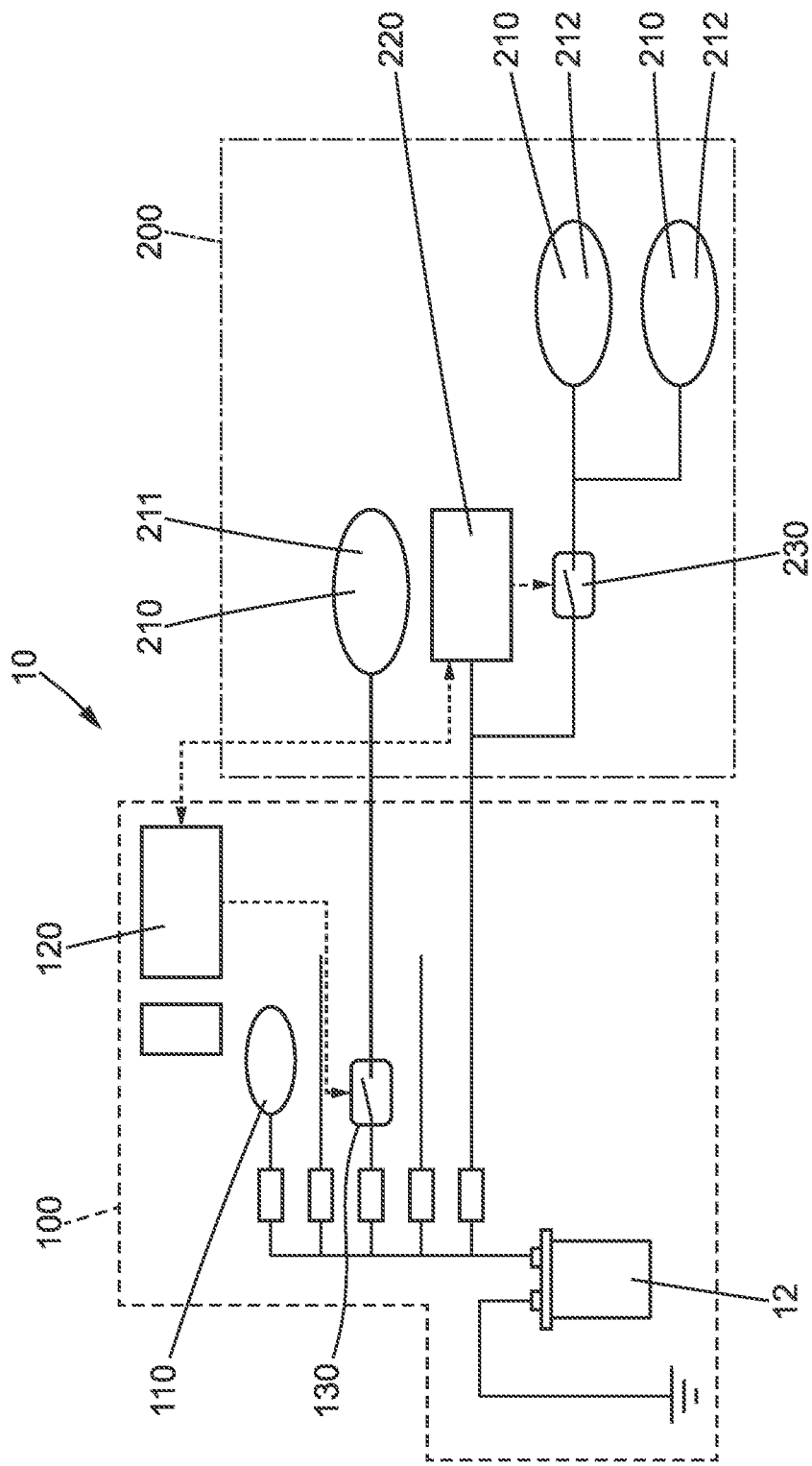
FIG. 3 shows a schematic layout of an on-board electrical network of the truck represented on FIG. 2.

The on-board electrical network 10 is further schematically represented on the layout of FIG. 3. The on-board electrical network 10 supplies both the base-line loads 110 and the auxiliary loads 210.

The truck 1 comprises an internal combustion engine and an alternator for supplying current to the on-board electrical network 10, and thus to base-line loads 110 and to the auxiliary loads 210, from the internal combustion engine, when the internal combustion engine is ON. A battery 12 is connected to the on-board electrical network 10 for supplying current to the on-board electrical network 10, and thus to base-line loads 110 and to the auxiliary loads 210, when the internal combustion engine is OFF.

The base-line equipment 100 comprises a base-line electronic control unit 120 for controlling the base-line loads 110 and the auxiliary loads 210.

The auxiliary loads 210 which are added to the truck 1 by the truck body builder after the base-line loads 110 can be connected to the on-board electrical network 10 in different ways.

According to a first example, the base-line equipment 110 comprises a base-line actuator 130 controlled by the base-line electronic control unit 120, and an auxiliary loads named a direct auxiliary load 211 coupled to the base-line actuator 130. Alternatively, the auxiliary loads 210 could comprise several direct auxiliary loads 211. Moreover, the base-line equipment 110 could comprise several base-line actuators controlled by the base-line electronic control unit 120, each coupled to one or more direct auxiliary loads.

According to a second example, the auxiliary equipment 200 comprises an auxiliary electronic control unit 220 communicating with the base-line electronic control unit 120, an auxiliary actuator 230 controlled by the auxiliary electronic control unit 220 and auxiliary loads named indirect auxiliary loads 212 coupled to the auxiliary actuator 230. Alternatively, the auxiliary loads 210 could comprise only one indirect auxiliary load 212. Moreover, the auxiliary equipment 200 could comprise several electronic control unit each communicating with the base-line electronic control unit 120, and each controlling an auxiliary actuator coupled to one or more indirect auxiliary loads.

The on-board electrical network 10 needs to be protected, especially when, the internal combustion engine is to be switched off. A method for protecting the on-board electrical network 10 of the truck 1 is implemented in the truck 1. This method is represented on the diagram of FIG. 4.

For example, the method is implemented while the truck 1 is moving, in particular when the truck is intended to be switched to a fuel saving mode in which the truck 1 is moving with the internal combustion engine off or running at low speed.

For the garbage truck 1, it applies especially when the internal combustion engine is to be turned off as soon as garbage truck 1 reaches standstill.

When the internal combustion engine is ON, the method comprises a first step S1 consisting in determining that the internal combustion engine is to be turned off. For example, if the garbage truck 1 is equipped with a start & stop function, it is determined that the internal combustion engine is to be turned off when the speed of the garbage truck is below a predetermined threshold, or when the garbage truck 1 reaches standstill.

Once it is determined that the internal combustion engine is to be switched off, it can be determined in a complementary step S1b to the first step S1, if at least one of the auxiliary loads is ON. If none of the auxiliary loads is ON, then the internal combustion engine is turned off. Indeed, the battery 12 is designed to provide current supply to the base-line loads that are ON. If at least one of the auxiliary load is ON, the method proceeds to a second step S2.

This complementary step S1b is optional. It allows the next step of the method to be carried out only if it is necessary, i.e. only if at least one auxiliary loads is ON, and thus a risk of a voltage drop of the on-board electrical network exists if the internal combustion engine is turned off. If this complementary step S1 is not carried out, the method proceeds directly to the second step S2 after the first step S1.

In the second step S2, the total current consumption I_total of the truck is determined. The total current consumption I_total of the truck is defined as the sum of the current consumption of the base-line loads I_BL and the current consumption of the auxiliary loads I_AL. In the illustrated example, the current consumption of the electric compactor is taken into account in the total current consumption if the electric compactor is ON.

Then, in a third step S3, the battery maximum capacity I_max is determined. Under a battery maximum capacity, it is understood a maximum current (expressed in ampere, A) that can be delivered by the battery irrespective of the remaining energy stored in the battery (expressed in ampere-hour, A.h).

The battery maximum capacity I_max is determined depending on at least one of the following parameters, including:
the State of Charge SoC of the battery 12,
the State of Health SoH of the battery 12, reflecting the ageing of the battery 12;
the temperature T of the battery 12.

The battery maximum capacity I_max is thus adapted throughout the use of the truck 1, so as to be as close as possible to the real value.

Alternatively, the battery maximum capacity I_max can be a fixed predetermined value given by the specification of the battery 12.

In a fourth step S4, the total current consumption I_total is compared to the battery maximum capacity I_max. If the total current consumption I_total is lower than the battery maximum capacity I_max, meaning that the battery 12 can supply current to all the base-line loads 110 and the auxiliary loads 210 which are ON, the internal combustion engine is turned off. The battery 12 then provides current supply to the base-line loads 110 and to the auxiliary loads 210 while the voltage of the on-board electrical network 10 remains in an operating range of the on-board electrical network 10. In this case, the electric compactor can be supplied in current by the battery 12.

If the total current consumption I_total is higher than the battery maximum capacity I_max, the current consumption of at least one adjustable auxiliary load, selected from the one or more auxiliary loads is either reduced, or the internal combustion engine is prevented from being turned off.

In the first alternative where the current consumption of the at least one adjustable is reduced, all the auxiliary loads can be selected as adjustable auxiliary load, and the current consumption of all the auxiliary loads is then reduced. Alternatively, the one or more auxiliary loads are each assigned to a predetermined supply priority and the one or more auxiliary loads are selected as the at least one adjustable auxiliary load depending on the assigned predetermined supply priority.

When the current consumption of the at least one adjustable auxiliary load 210 is reduced an alert is sent to the driver.

Moreover, the current consumption of the at least one adjustable load is reduced so that the total current consumption I_total becomes lower than the battery maximum capacity I_max. For reducing the current consumption of the adjustable load, the current consumption of the at least one adjustable auxiliary load can be either decreased, but still be above zero, or reduced to zero. When the current consumption is reduced, the adjustable auxiliary load can still work but in a degraded mode. When the current consumption is reduced to zero, the adjustable auxiliary load is switched off. For example, the electric compactor can be switched off.

In particular, the current consumption of the at least one adjustable auxiliary load is reduced using a relay, or a transistor, for example a MOSFET switch. When using a transistor, the current consumption of the adjustable auxiliary load is reduced to a lower level (but still above zero). When using a relay, the current consumption of the adjustable auxiliary load is reduced to zero and the current supply to the adjustable load is stopped.

If the direct auxiliary load 211 is selected among the at least one adjustable auxiliary load, the base-line electronic control unit 120 activates the base-line actuator 130 and the base-line actuator 130 reduces the current consumption of the direct auxiliary load 211.

If the indirect auxiliary load 212 is selected among the at least on adjustable auxiliary load, the base-line electronic control unit 120 sends a control message to the auxiliary electronic control unit 220. Then, the auxiliary electronic control unit 220 activates the auxiliary actuator 230 and the auxiliary actuator 230 reduces the current consumption of the direct auxiliary load 212.

Any setups of the on-board electrical network 10 that would allow to reduce the current consumption of the at least one adjustable load is also encompassed by the present disclosure.

Once the current consumption of the at least one adjustable load is reduced, the internal combustion engine can be turned off, and the battery 12 then provides current supply to the base-line loads 110 and to the auxiliary loads 210 which are ON, while the voltage of the on-board electrical network 10 remains in an operating range of the on-board electrical network 10.

In the second alternative where the internal combustion engine is prevented from being turned off, the alternator carry on to deliver current to the on-board electrical network 10 and ensures the current supply of all the auxiliary loads 210 and base-line loads 110 which are ON. Thus, the auxiliary loads continue to operate in a normal mode, without causing a voltage drop of the voltage supply. In the illustrated example, keeping the internal combustion engine ON enables the electric compactor to carry on operating.

The on-board electrical network 10 also needs to be protected when the internal combustion engine is OFF, and that at least one selected auxiliary load, selected from the one or more auxiliary loads is OFF and is requested to be activated. Indeed, when the internal combustion engine is OFF, only the battery 12 provides current supply to the base-line loads 110 and to the auxiliary loads 210, and it must be determined whether the battery 12 can also provide current supply to the selected auxiliary load.

Figure 4:
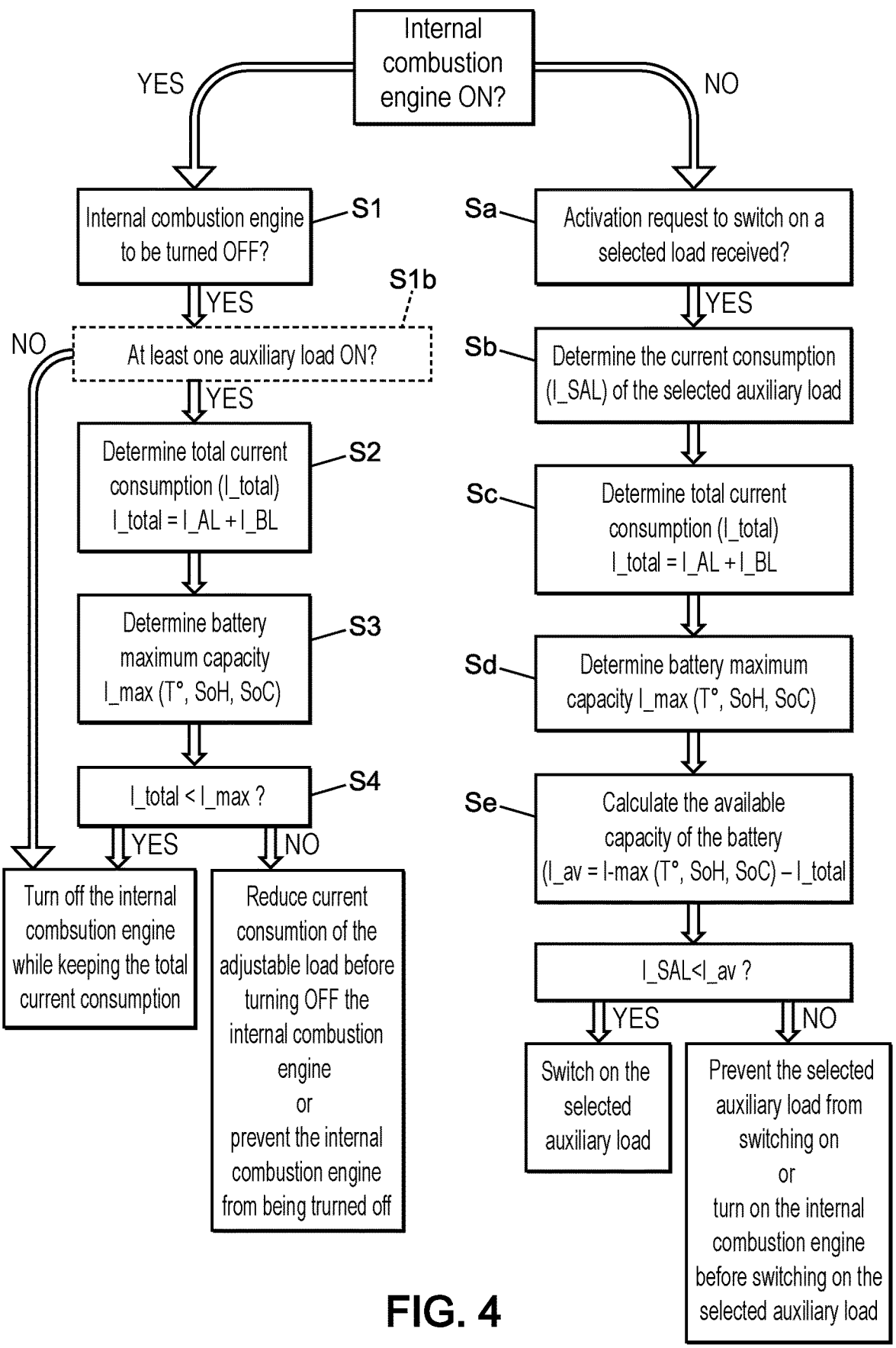
FIG. 4 shows a diagram representing the method for protecting the on-board electrical network according to one embodiment.

In a first embodiment represented on FIG. 4, when the internal combustion engine is OFF, the method comprises an a-step Sa where an activation request to switch on the at least one selected auxiliary load is received. For example, the internal combustion engine is OFF, and the electric compactor is OFF, and a request is sent to switch on the electric compactor.

In a b-step, the current consumption of the at least one selected auxiliary load I_SAL is determined. It corresponds to the current consumption that the at least one selected auxiliary load has when it is ON. In the illustrated example, the current consumption of the electric compactor is determined.

In a c-step Sc, the total current consumption I_total of the truck 1 is determined. The total current consumption I_total is defined as the sum of the current consumption of the one or more base-line loads I_BL and the one or more auxiliary loads I_AL which are ON.

In a d-step Sd the battery maximum capacity I_max is determined. Then, in an e-step Se, an available capacity of the battery I_av is calculated. The available capacity of the battery I_av corresponds to the difference between the battery maximum capacity I_max and the total current consumption I_total. It corresponds to the maximum current supply that the battery 12 can provide in addition to the current supply that the battery 12 already provides to the one or more base-line loads I_BL and the one or more auxiliary loads I_AL which are ON.

If the current consumption of the at least one selected auxiliary load I_SAL is lower than the available capacity of the battery I_av, it means that the battery 12 can provide current supply to the selected auxiliary load. The selected auxiliary load is thus switched on. For example, the current consumption of the electric compactor is lower than the available capacity of the battery I_av, and the electric compactor is switched on.

If the current consumption of the at least one selected auxiliary load I_SAL is higher than the available capacity of the battery I_av, it means that the battery cannot provide current supply to the selected auxiliary load. Thus, the selected auxiliary load is either prevented from switching on, or the internal combustion engine is turned on before the selected auxiliary load is switched on.

In the first alternative where the selected auxiliary load is prevented from switching on, it avoids the battery to provide current supply to the selected auxiliary load as the selected auxiliary load remains OFF. The electric compactor remains OFF. The voltage of the on-board electrical network 10 thus remains in its operating range.

In the second alternative where the internal combustion engine is turned on before the selected auxiliary load is switched on, it allows the alternator to provide current supply to the on-board electrical network 10 instead of the battery 12. Thus, the selected auxiliary load can be supplied in current without causing a voltage drop in the on-board electrical network 10. The electric compactor is thus switched on after the internal combustion engine is turned on.

Figure 5:
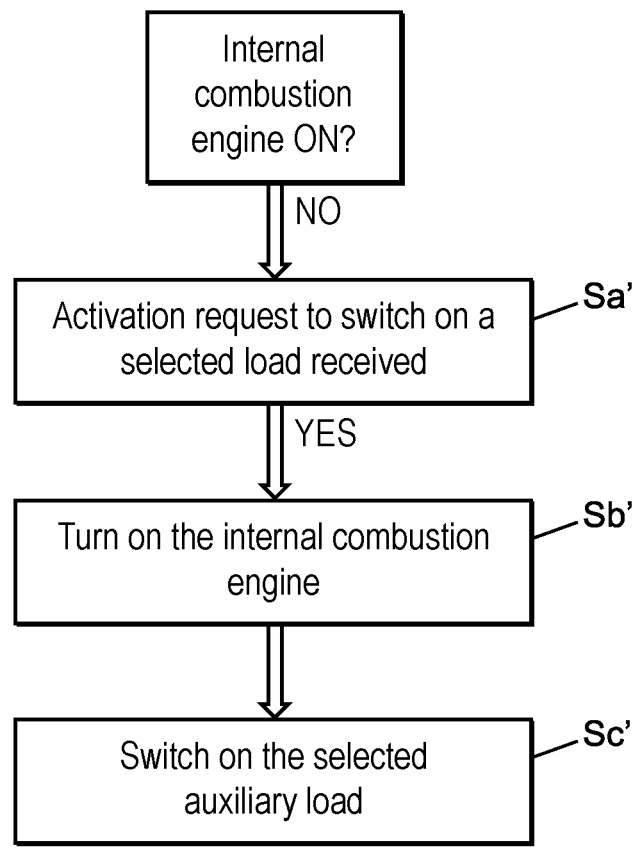
FIG. 5 shows a diagram representing an alternative to the method represented on FIG. 4.

In a second embodiment represented on FIG. 5, when the internal combustion engine is OFF, the method comprises an a'-step Sa', where an activation request to switch on the at least one selected auxiliary load is received. Then, in a b'-step Sb', the internal combustion engine is turned on. Finally, in a c'-step, the selected auxiliary load is switched on. Therefore, it is not determined if the battery 12 can provide current supply to the selected auxiliary load in addition to the addition to the current supply that the battery 12 already provides to the one or more base-line loads I_BL and the one or more auxiliary loads I_AL which are ON. The internal combustion engine is turned on before the selected auxiliary load is switched on. Therefore, the alternator provides current supply to the on-board electrical network 10 instead of the battery 12 when the selected auxiliary load is switched on. Thus, the selected auxiliary load can be supplied in current without causing a voltage drop in the on-board electrical network 10. In this case, the electric compactor is switched only after the internal combustion engine is turned on.

It is to be understood that this second embodiment replaces all the steps from a-step Sa to e-step Se shown on FIG. 4, but the first step S1 to the third step S3 remains identical.

The current consumption of the one or more auxiliary loads 210 is recorded. It is then possible to learn about the current consumption of each auxiliary loads 210 and to know how often an auxiliary load is switched off.

The invention claimed is:

1. A method for protecting an on-board electrical network of a truck, the truck comprising:
    an internal combustion engine,
    a base-line equipment provided by a truck manufacturer having one or more base-line loads connected to the on-board electrical network, configured to be supplied by the on-board electrical network and to have a current consumption,
    an auxiliary equipment fitted a posteriori by a truck body builder having one or more auxiliary loads connected to the on-board electrical network, configured to be supplied by the on-board electrical network and to have a current consumption,
    an alternator for supplying current to the on-board electrical network from the internal combustion engine, and
    a battery having a battery maximum capacity and connected to the on-board electrical network,
    the method comprising, when the internal combustion engine is ON:
        determining that the internal combustion engine is to be turned off,
        determining a total current consumption of the truck as the sum of the current consumption of the one or more base-line loads and the one or more auxiliary loads,
        determining the battery maximum capacity,
        comparing the total current consumption to the battery maximum capacity and if the total current consumption is lower than the battery maximum capacity, turning off the internal combustion engine, and
        if the total current consumption is higher than the battery maximum capacity, reducing the current consumption of at least one adjustable auxiliary load selected from the one or more auxiliary loads so that the total current consumption becomes lower than the battery maximum capacity or preventing the internal combustion engine from being turned off,
    the method further comprising:
        when the internal combustion engine is OFF and when at least one selected auxiliary load selected from the one or more auxiliary loads is OFF:
            receiving an activation request to switch on the at least one selected auxiliary load,
            determining the current consumption of the at least one selected auxiliary load,
            determining a total current consumption of the truck as the sum of the current consumption of the one or more base-line loads and the one or more auxiliary loads,
            determining the battery maximum capacity,
            calculating an available capacity of the battery corresponding to the difference between the battery maximum capacity and the total current consumption,
            if the current consumption of the at least one selected auxiliary load is lower than the available capacity of the battery, switching on the selected auxiliary load, and
            if the current consumption of the at least one selected auxiliary load is higher than the available capacity of the battery, preventing the selected auxiliary load from switching on.

2. The method of claim 1, further comprising, after determining that the internal combustion engine is to be turned off:
determining if at least one of the one or more auxiliary loads is ON, and if at least one of the one or more auxiliary load is ON, continuing the method, and
if none of the one or more auxiliary loads is ON, turning off the internal combustion engine.

3. The method of claim 1, wherein the battery maximum capacity can be determined depending on at least one of the following parameters, including:
the State of Charge (SoC) of the battery,
the State of Health (SoH) of the battery (ageing), and
the temperature (T) of the battery.

4. The method of claim 1, wherein the current consumption of the at least one adjustable auxiliary load is reduced using a relay or a transistor.

5. The method of claim 1, wherein the method is implemented while the truck is moving, in particular when switching to a fuel saving mode in which the truck is moving with the internal combustion engine turned off.

6. The method of claim 1, wherein an alert is sent to the driver when the current consumption of the at least one adjustable auxiliary load is reduced.

7. The method of claim 1, wherein if the total current consumption is higher than the battery maximum capacity, all of the auxiliary loads are selected as adjustable auxiliary load and the current consumption of all of the auxiliary loads is reduced.

8. The method of claim 1, wherein the one or more auxiliary loads are each assigned to a predetermined supply priority and if the total current consumption is higher than the battery maximum capacity, the one or more auxiliary loads are selected as the at least one adjustable auxiliary load depending on the assigned predetermined supply priority.

9. The method of claim 1, wherein the current consumption of the one or more auxiliary loads is recorded.

10. The method of claim 1, wherein the current consumption of the at least one adjustable auxiliary load is reduced using a MOSFET switch.

11. A truck comprising:
an on-board electrical network,
an internal combustion engine,
a base-line equipment provided by a truck manufacturer having one or more base-line loads connected to the on-board electrical network, configured to be supplied by the electrical network and to have a current consumption,
an auxiliary equipment fitted a posteriori by a truck body builder having one or more auxiliary loads connected to the on-board electrical network, configured to be supplied by the on-board electrical network and to have a current consumption,
an alternator for supplying current to the on-board electrical network from the internal combustion engine, and
a battery having a battery maximum capacity and connected to the on-board electrical network,
wherein the method for protecting the on-board electrical network of the truck of claim 1 is implemented.

12. The truck of claim 11, wherein the base-line equipment comprises a base-line electronic control unit configured to control the one or more base-line loads and the one or more auxiliary loads.

13. The truck of claim 11:
wherein the base-line equipment comprises a base-line actuator, the base-line electronic control unit being configured to control the base-line actuator,
wherein the one or more auxiliary loads comprise a direct auxiliary load coupled to the base-line actuator, and
wherein, when the total current consumption is higher than the battery maximum capacity and the direct auxiliary load is selected from among the at least one adjustable auxiliary load, the base-line electronic control unit is configured to activate the base-line actuator, and the base-line actuator is configured to reduce the current consumption of the direct auxiliary load.

14. The truck of claim 11:
wherein the auxiliary equipment comprises an auxiliary electronic control unit communicating with the base-line electronic control unit and an auxiliary actuator, the auxiliary control unit being configured to control the auxiliary actuator,
wherein the one or more auxiliary loads comprise an indirect auxiliary load coupled to the auxiliary actuator, and
wherein, when the total current consumption is higher than the battery maximum capacity and the indirect auxiliary load is selected from among the at least one adjustable auxiliary load, the base-line electronic control unit is configured to send a control message to the auxiliary electronic control unit, the auxiliary electronic control unit is configured to activate the auxiliary actuator, and the auxiliary actuator is configured to reduce the current consumption of the direct auxiliary load.

* * * * *